United States Patent
Schiffman et al.

(10) Patent No.: US 9,965,799 B2
(45) Date of Patent: May 8, 2018

(54) APPARATUS AND METHOD FOR INTERACTIVE PRODUCT DISPLAYS

(71) Applicant: Perch Interactive, Inc., New York, NY (US)

(72) Inventors: Jared Schiffman, Brooklyn, NY (US); Phillip Tiongson, New York, NY (US)

(73) Assignee: Perch Interactive, Inc., New York, NY (US)

(*) Notice: Subject to any disclaimer, the term of this patent is extended or adjusted under 35 U.S.C. 154(b) by 626 days.

(21) Appl. No.: 13/712,871

(22) Filed: Dec. 12, 2012

(65) Prior Publication Data
US 2014/0164190 A1   Jun. 12, 2014

(51) Int. Cl.
*G06Q 30/00*   (2012.01)
*G06Q 30/06*   (2012.01)

(52) U.S. Cl.
CPC .................. *G06Q 30/0641* (2013.01)

(58) Field of Classification Search
CPC ............... G06Q 30/06–30/0645; G06Q 50/01
See application file for complete search history.

(56) References Cited

U.S. PATENT DOCUMENTS

| | | | |
|---|---|---|---|
| 5,848,399 A * | 12/1998 | Burke | G06Q 10/087 235/383 |
| 6,607,275 B1 | 8/2003 | Cimini et al. | |
| 7,249,063 B2 | 7/2007 | McMullen et al. | |
| 7,830,259 B2 | 11/2010 | Walker et al. | |
| 7,978,184 B2 | 7/2011 | Morrison | |
| 8,223,196 B2 | 7/2012 | Carter et al. | |
| 9,336,700 B2 * | 5/2016 | Lashina | G09F 27/00 |
| 2002/0161651 A1 | 10/2002 | Godsey et al. | |
| 2002/0184098 A1 | 12/2002 | Giraud et al. | |
| 2004/0044564 A1 | 3/2004 | Dietz et al. | |
| 2004/0103017 A1 | 5/2004 | Reed et al. | |
| 2013/0110666 A1 * | 5/2013 | Aubrey | 705/26.5 |
| 2013/0293530 A1 * | 11/2013 | Perez | G06T 19/006 345/418 |
| 2015/0112826 A1 * | 4/2015 | Crutchfield, Jr. | G06Q 30/0601 705/26.1 |

FOREIGN PATENT DOCUMENTS

EP   1 035 485 A2   9/2000

OTHER PUBLICATIONS

Rispo, Vito, "How to Sell More; Encourage Your Customers to Touch Everything", AdSavvy Ads That Turn You On, Dec. 16, 2012, 4 pgs., http://www.adsavvy.org/how-to-sell-more-encourage-your-customers-to-touch-everything/.

(Continued)

*Primary Examiner* — Adam Levine
(74) *Attorney, Agent, or Firm* — Cahn & Samuels, LLP

(57) ABSTRACT

A computer implemented method includes receiving media content for interactive product display systems used with different products in different retail establishments. Product interaction data characterizing consumer gestures performed in connection with the different products in the different retail establishments is collected. The media content and product interaction data is analyzed to form marketing data. The display of media content at an interactive product display system of a retail establishment is remotely initiated.

6 Claims, 9 Drawing Sheets

(56) References Cited

OTHER PUBLICATIONS

Samuelson, Kristin, "In the Age of Online Stores, Shoppers Still Like to Touch Products", Oct. 28, 2010, 3 pgs., http://articles.latimes.com/2010/oct/28/business/la-fi-retail-touch-20101028.
Williams et al., "Please Touch the Merchandise", Harvard Business Review, HBR Blog Network, Dec. 15, 2011, 2 pgs., http://blogs.hbr.org/cs/2011/12/please_touch_the_merchandise.html.
Wolf et al., "The Power of Touch: An Examination of the Effect of Duration of Physical Contact on the Valuation of Objects", Judgment and Decision Making, vol. 3, No. 6, Aug. 2008, pp. 476-482.

* cited by examiner

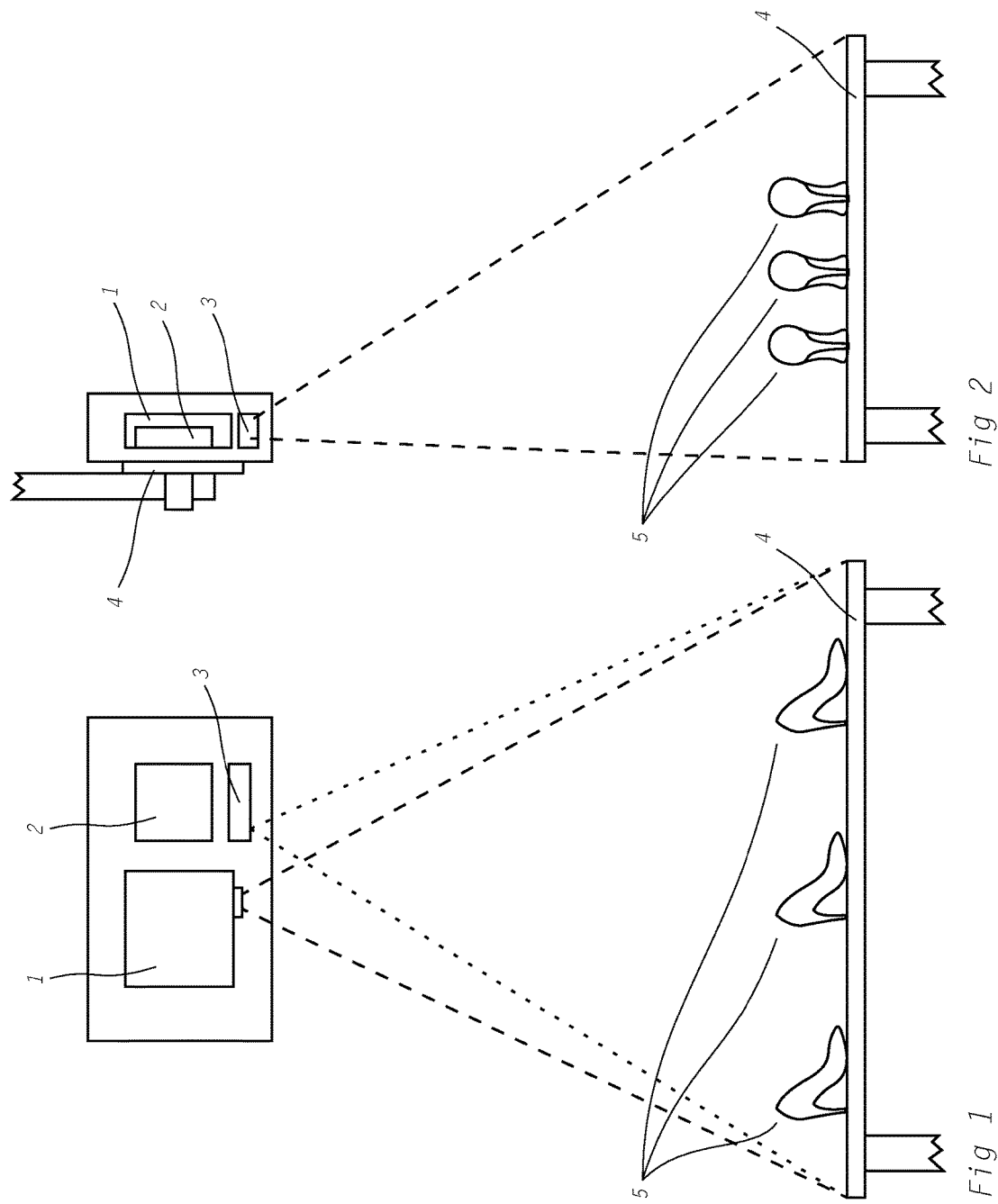

APPARATUS AND METHOD FOR INTERACTIVE PRODUCT DISPLAYS

FIELD OF THE INVENTION

The invention relates generally to interactive product displays. More particularly, the invention relates to network-based interactive product displays in retail establishments.

BACKGROUND OF THE INVENTION

Interactive displays are known in the art. These systems include interactive touch-screens, often called kiosks, which are used to inform customers about a retailer's products. From a technical perspective, these displays have traditionally consisted of a computer, a computer monitor, and a touch-sensitive surface that is overlaid or incorporated directly into the monitor. In general, these displays are oriented vertically or at an angle off the vertical.

More recently, there has been significant development in the design of horizontal interactive surfaces, sometimes called interactive tables. These systems have been used in museum exhibits, at trade shows, and occasionally in retail environments. In many cases, these displays are simply traditional touch screens that have been mounted horizontally. Other touch table systems have utilized projection either from below the table onto a translucent surface, or from above onto an opaque white or off-white surface. Projection-based interactive systems oftentimes incorporate a camera, mounted above or below the table alongside the projector, which can record interactions at the table. The video signal generated by the camera is then processed by the computer using a variety of computer vision techniques to derive relevant information, including touch points and gestures.

Alongside the development of interactive displays, there has been significant growth in the field of network-based digital display systems. The preponderance of these non-interactive digital displays is due to the falling cost of the core technologies and the rise of inexpensive broadband internet connectivity. In essence, these network-based digital displays comprise a digital display (usually an LCD or Plasma screen) and a compact computer that drives the display. The computer receives media over the network connection from a common source, and then stores that media locally on a hard drive or other memory device for replay at a later point in time. With these displays, the information flows in one direction—from a provider to a point of sale platform.

In this context, it would be desirable to provide improved techniques for interactive product displays.

SUMMARY OF THE INVENTION

A computer implemented method includes receiving media content for interactive product display systems used with different products in different retail establishments. Product interaction data characterizing consumer gestures performed in connection with the different products in the different retail establishments is collected. The media content and product interaction data is analyzed to form marketing data. The display of media content at an interactive product display system of a retail establishment is remotely initiated.

An interactive product display system for a retail establishment includes a display to present media content in association with a product. A sensor gathers product interaction data characterizing consumer gestures performed in connection with the product. A processor evaluates the product interaction data and selectively alters media content based upon the product interaction data. A network interface circuit uploads the product interaction data to a centralized resource and receives from the centralized resource new media content.

BRIEF DESCRIPTION OF THE FIGURES

The invention is more fully appreciated in connection with the following detailed description taken in conjunction with the accompanying drawings, in which:

FIG. 1 is a front view of a system configured in accordance with an embodiment of the invention.

FIG. 2 is a side view of a system configured in accordance with an embodiment of the invention.

Like reference numerals refer to corresponding parts throughout the several views of the drawings.

DETAILED DESCRIPTION OF THE INVENTION

Figure 3:
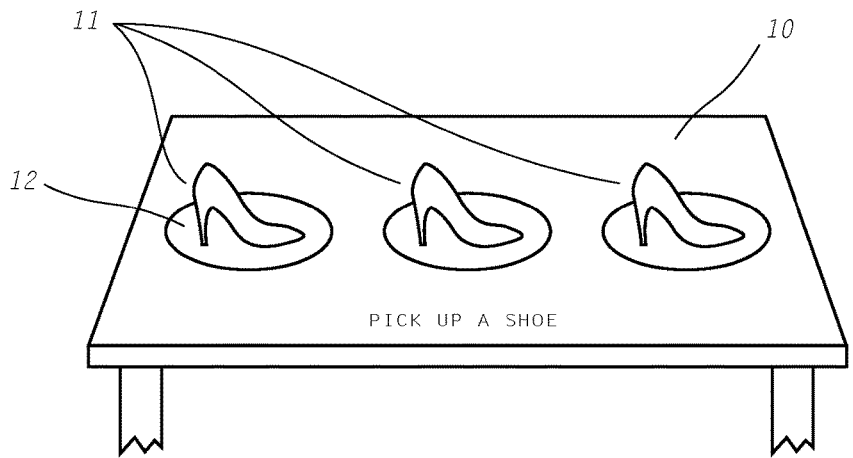
FIGS. 3-5 illustrate a sequence of interactions with a system configured in accordance with an embodiment of the invention.

By way of overview, an embodiment of the invention is an interactive display system that comprises (a) hardware in a self-contained unit, (b) interactive display software, (c) and server-side software. The self-contained hardware unit includes a display device capable of manifesting a media display onto or around a set of retail products, a sensing system capable of sensing interaction with display media and with the products, and a system for processing data. The processing system is connected to a network that provides the processing system with data, collects analytics from the processing system, and allows for remote monitoring and maintenance.

The display device may display a wide variety of media related to the physical products on display. This includes but is not limited to textual descriptions of the products, technical specifications of the products, special features of the products, photographs associated with the products, diagrams depicting the products' use, videos or animations related to the products or demonstrating their use. The media may include areas of bright color (usually white) that serve as spotlights onto or highlights around each of the products. Unlike similar media that may be used in a traditional touch screen display, this media is located on and around the products on display, and therefore may make direct visual reference to the products and interaction with the products.

The sensing system consists of a sensing device and software that interprets the raw data generated by the sensing device. The sensing device senses interaction with the products on display and the display surface. The software receives the raw data generated by these interactions and detects the specific type of interaction that took place. For example, the sensing system software can detect if a person's hand touches a product, picks up a product, manipulates the product, is near a product or touches the surface where the product rests. The system can detect interactions with the products by multiple people at the same time. For example, if user A picks up product X, and user B touches product Y, both interactions are sensed.

The sensing system provides the information regarding the user's interactions to the interactive display software. The computing system then updates the media on display based upon the received interactions and upon its own internal state. When multiple people interact with different products and/or the display surface, the media displayed may be independently changed depending on each individual interaction.

One aspect of the interactive display software is the file format that it utilizes to encode the interactive visual display. Unlike existing file formats for interactive media, the invention's file format encodes the position on the display that the physical product is to be placed. The file format is also unique in that it encodes for interactions with physical products. For example, if a given display is set up for five shoes, the file format will specify where each of the shoes will be placed on the display. It will also encode, for each of the shoes, what media will be revealed with each specific user interaction, such as picking up a shoe.

Another aspect of the interactive display software is that all user interactions are tracked and recorded, forming a robust consumer analytics system. Once again, the invention is unique in this realm in that the recorded data includes interactions with physical products. Each type of interaction, with each product is tracked separately, as are more standard interactions such as touching virtual buttons on the surface of the display. All tracked data is reported to a central server via a network connection.

All installed interactive display units are connected via a network connection to a central server running server-side software. This server-side software includes several components that add significant functionality to the network of installed devices across a retailer's set of stores.

A first component of the server-side software is a user-authenticated content management system that allows the retailer to update product layouts, content and media remotely on the interactive displays. Via the content management system, the retailer is able to view the set of interactive display units installed at their stores. For each display unit, the retailer may assign specific product layouts, media and content. They may also select multiple units and assign all of the selected units the same media and content. Upon confirming their assignments, the product layout, media and content is queued for download to the installed display units at a convenient time, generally after the store is closed for the night. Once again, this content management system is unlike others in that it references media associated with physical products on display in actual stores.

Another component of the server-side software is a monitoring system that enables retailers and technical support specialists to see the status of each of the installed interactive display units. The monitoring system displays whether the device is on or not, and whether the interactive display software is running correctly. If the monitoring system detects an issue, it notifies a technical support specialist via email or other means of communication.

Still another component of the server-side software is a system for permanently recording, analyzing and displaying the data received from the network of interactive display units. The data received is a compressed representation of the user interactions with the products on the display and with the display surface. Each data packet received contains information about what was touched or picked up, when the event occurred, and the specific display on which it occurred. The server-side software analyzes the incoming data for a given display or across identical displays to provide useful analytics to the retailer. For example, it can determine which products were touched the most and least, which products are most popular across all stores with the same display, and whether the context of a product affected its popularity. Retailers can also track product popularity over time. The unique attribute of the online analytics system is that it tracks physical interactions with products.

FIGS. 1 and 2 respectively show front and side views of a system configured in accordance with an embodiment of the invention. A projector 1 projects onto a table surface 4. A set of products 5 rests on the table. A computer 2 connects to the projector and provides a video signal for projection. A sensor 3 looks down upon the table and products; the sensor 3 is also connected to the computer 2.

Figure 4:
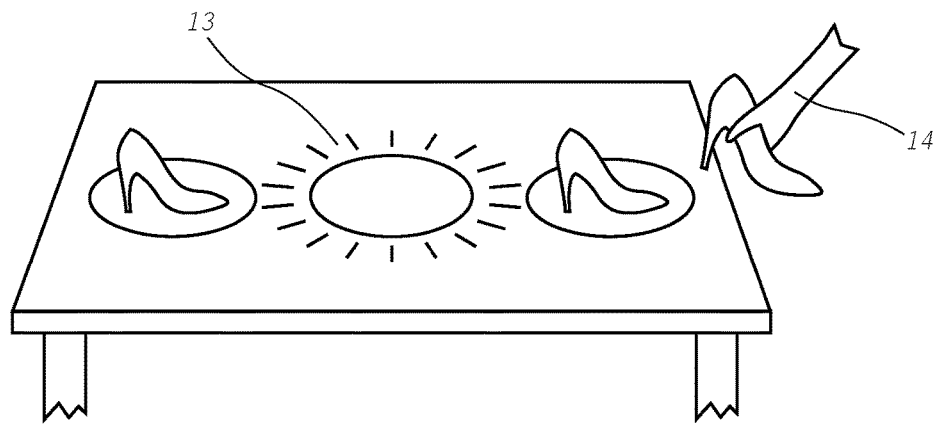
Figure 5:
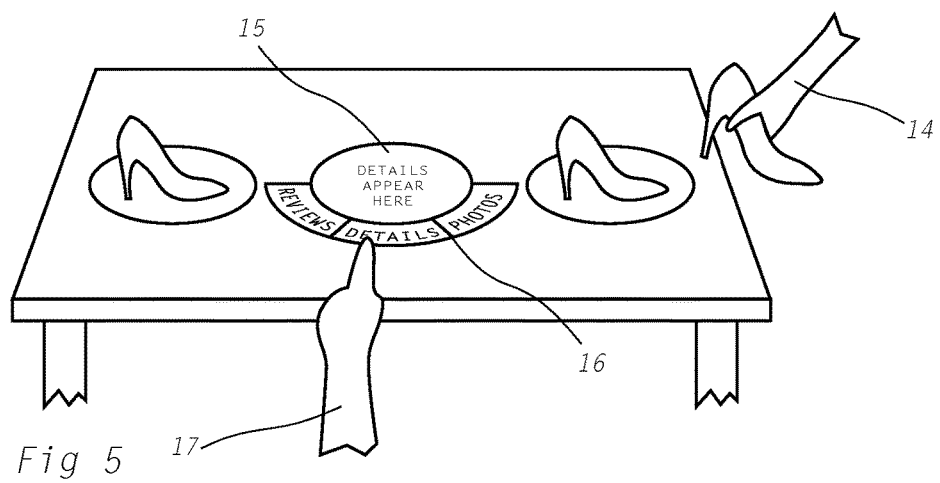

FIGS. 3, 4 and 5 illustrate one possible sequence of interactions with the system.

FIG. 3 shows a display as it may appear in static mode, prior to interaction. A set of products 11 rests upon a table surface 10, where a background image is projected. In this example, a spotlight 12 lights up the products. The spotlight may be generated by projector 1.

FIG. 4 illustrates one possible interaction, which in this case, involves an individual 14 picking up one of the products. When the product is picked up from the table, the sensor notices that the product has been removed from the area, and the software responds by creating an animation 13 in the spotlight area where the product was originally positioned.

FIG. 5 illustrates the display after a typical interaction. A product has been picked up from the table. In the area where the product was originally positioned, the software displays information 15 about the product, such as a description, photos, videos or other media. A typical format for the interactive display is to show a menu of options 16 in front of the area where the product was originally. At this point, the user, with their other hand 17, may touch one of non-selected menu options to show different media or information in the central display.

Figure 6:
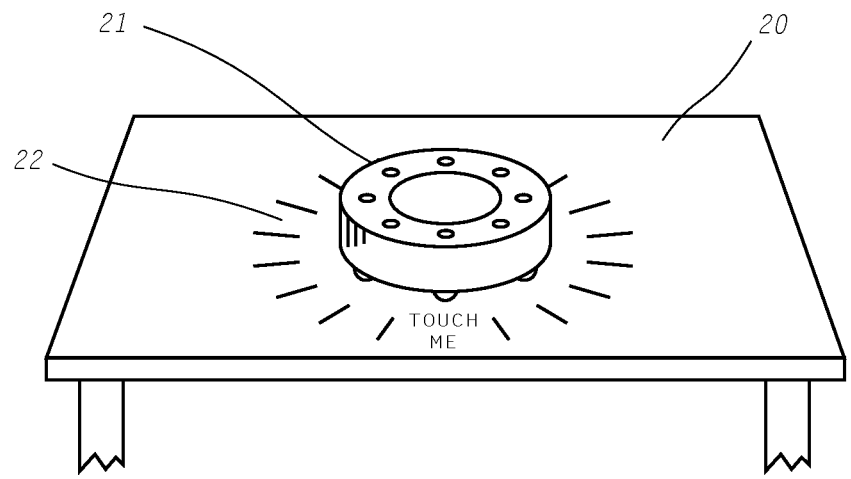
FIGS. 6-8 illustrates an alternate sequence of interactions with a system configured in accordance with an embodiment of the invention.
Figure 7:
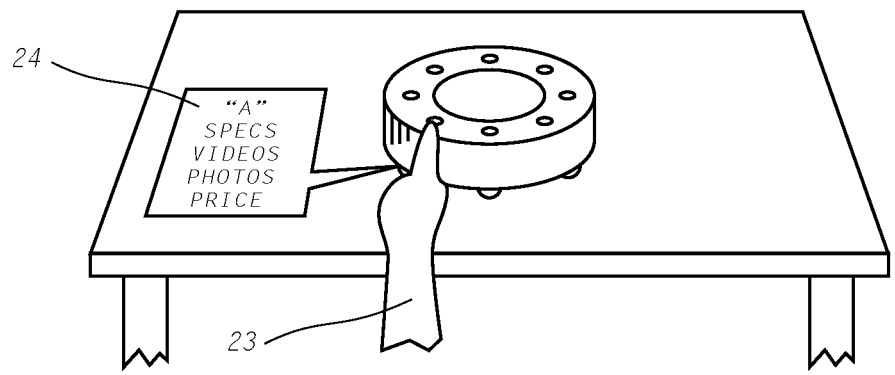
Figure 8:
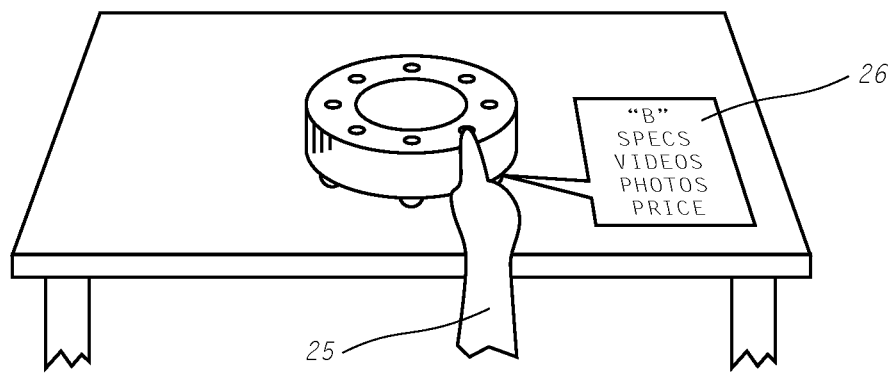

FIGS. 6, 7 and 8 illustrate a second possible sequence of interactions with the system. FIG. 6 shows a single product 21 resting at the center of the table display 20. An animation 22 surrounds the product, attracting attention and enticing shoppers to touch the product.

FIG. 7 illustrates interaction with the system presented in FIG. 6. In particular, when a user 23 touches the product on display, the projector 1 shows information about the product, such as text, photo, videos and other media. The information shown may be specific and unique to the place where the user touched the product. In FIG. 8, the user 25 is touching another part of the product. Based on the touch location, a different set of information is displayed.

Figure 9:
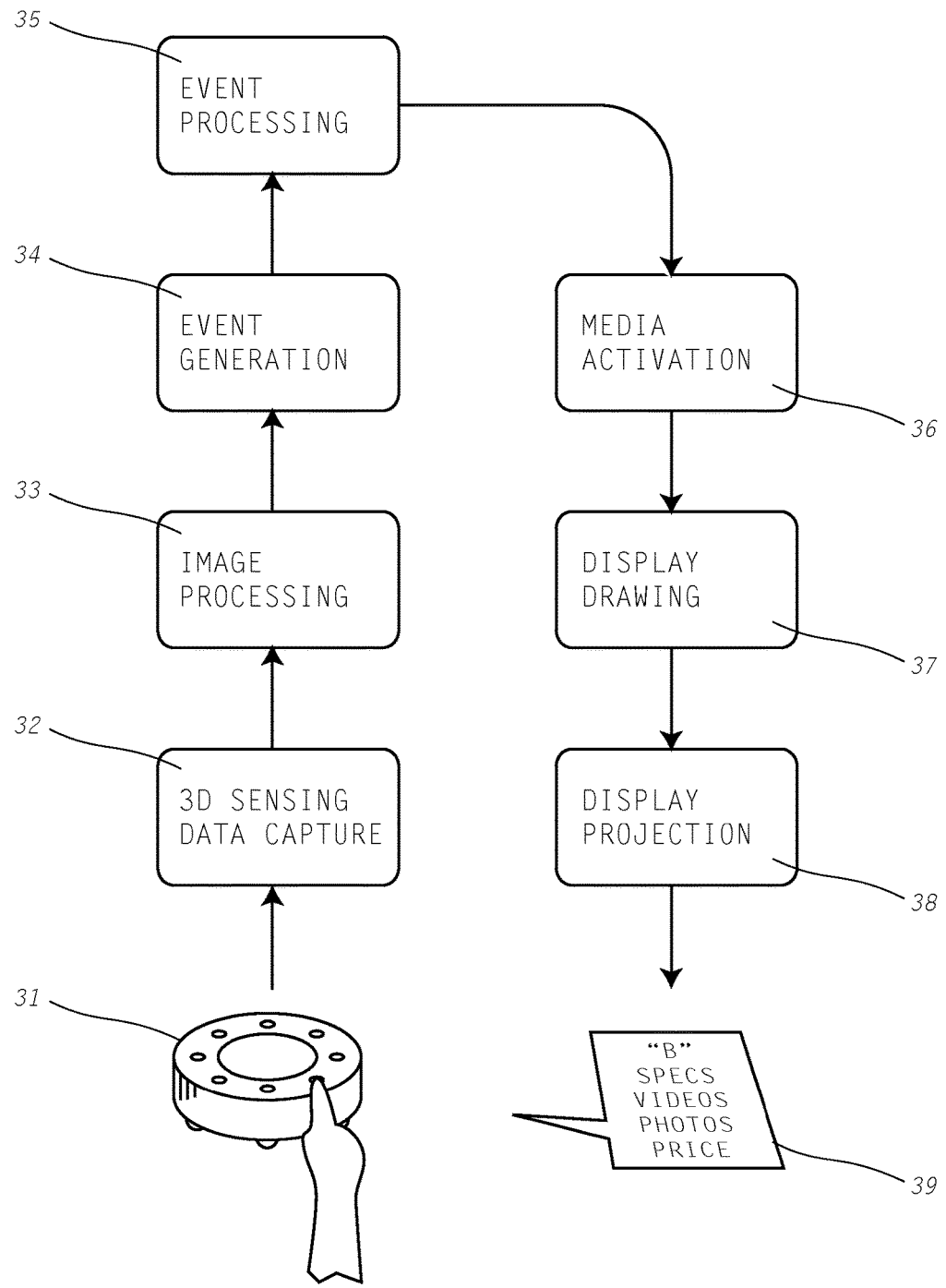
FIG. 9 illustrates processing operations associated with an embodiment of the invention.

FIG. 9 illustrates a sequence of data processing implemented by the system. As with any interactive system, this system is a feedback loop, so the starting point is arbitrary. First, the user interacts with a product 31 by touching it, picking it up, moving near it, or touching a place on the table nearby it. This hand-product-table interaction is viewed and captured by a three-dimensional (3D) Sensor 32, which relays raw 3D data to the computer. The computer then performs image processing 33 on the raw 3D data to determine if in fact there was an interaction, where it occurred, and what specific type of interaction it was. This data is fed to an event generator 34 which categorizes the information about the interaction and generates a software event (e.g., "hand moved in this location") associated with the interaction. Events are sent to an event processor 35 which determines which product the interaction was with, and whether or not to activate or change the projected media. Media, which may take the form of text, photos, videos, animations and other forms, is then activated 36, while other media may be deactivated. Information about the active and inactive media is then sent to the graphics drawing system 37 which actually produces a digital image to be displayed. This digital image is sent to the display device 38 which may be a projector, LCD screen or similar device. The displayed image appears on the surface of the table display 39. The user will view and process this newly changed image, and the process repeats itself 31. The system loop of blocks 31-39 cycles at a very high frequency, oftentimes between 20 and 60 frames per second.

Figure 10:
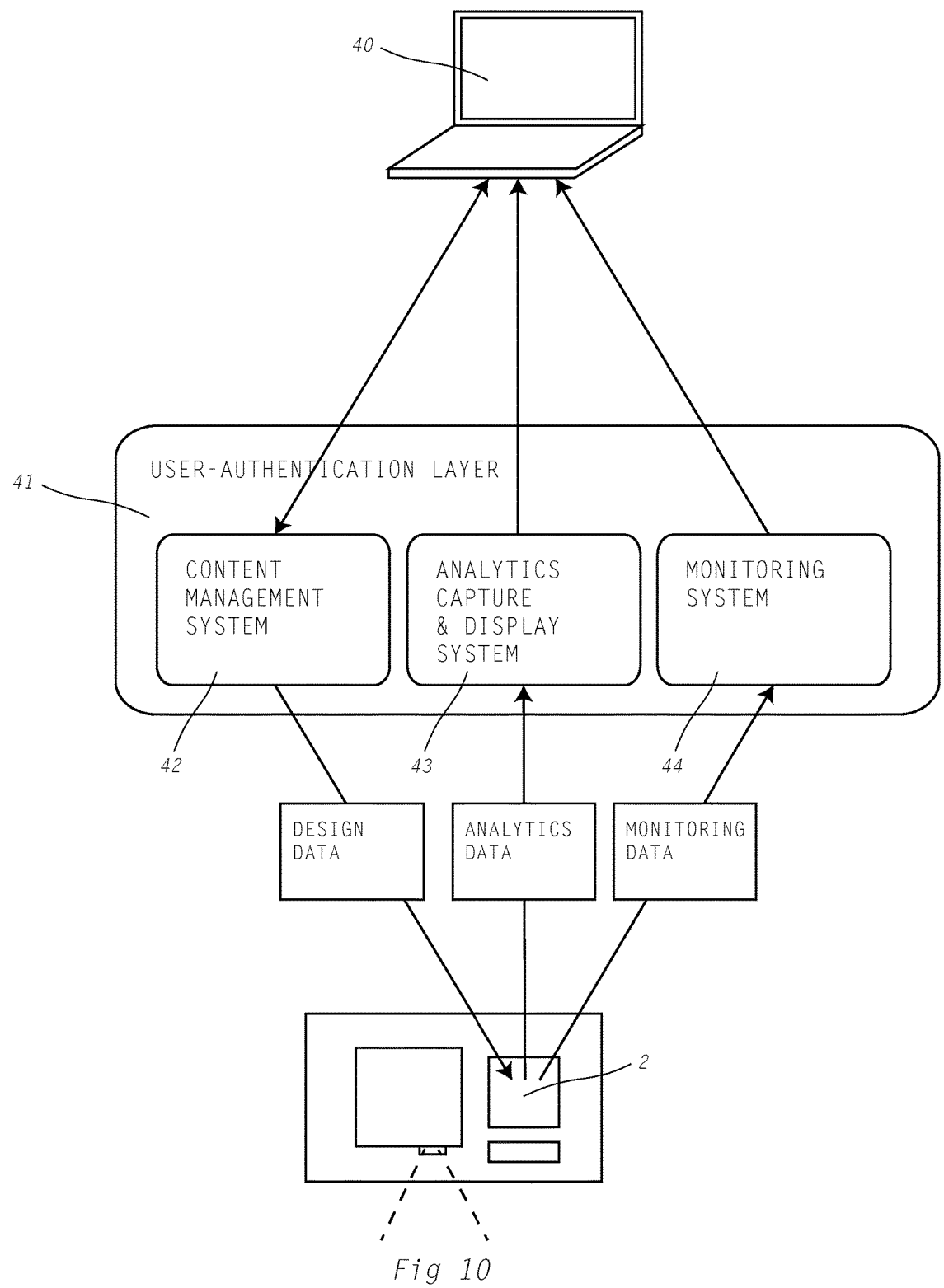
FIG. 10 illustrates interacting computers utilized in accordance with an embodiment of the invention.

FIG. 10 illustrates the role of the server software. A networked computer 40 accesses server software through a user-authenticated layer 41. One role of the server software is to store design data uploaded by the networked computer 40. The networked computer 40 may be at a retail establishment or a third-party design firm that prepares media displays for the retail establishment. Traditional graphic design tools and/or specialized software may be used to compose and configure the interactive display. This design data is uploaded to a content management system 42 that exists within the server software package. Ultimately this design data is downloaded to the computer 2 that exist within the actual in-store display hardware. If a retailer possesses multiple hardware units across many stores, each unit may download its own copy of the design data for display.

A second role of the server software is implemented with an analytics capture and display system 43, which provides analytics data captured by the in-store displays. This analytics data includes metrics for how often a given product or button on the display is touched. Analytics data from multiple displays and stores is aggregated by the analytics capture system 43.

A third role of the server software is implemented with a monitoring system 44, which stores, processes and displays monitoring data that is generated by the in-store displays. The computer in the in-store display pings this part of the server on a regular basis to indicate that it is still functioning. If the server software notices that a ping has not been received for an extended duration, it will send an alert to an administrator.

Figure 11:
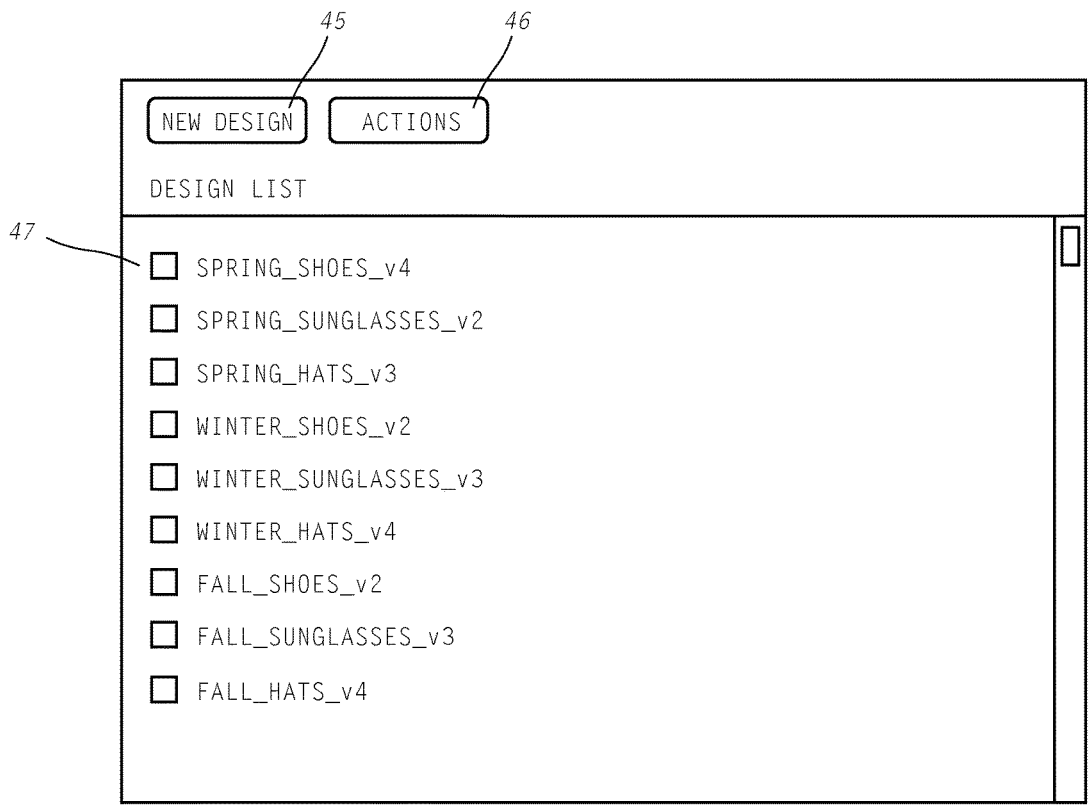
FIG. 11-15 illustrate server interface software utilized in accordance with embodiments of the invention.

FIG. 11 shows one interface to the server software. This screen shows access to a list of all the designs 45 that have been uploaded by the client currently logged in. The user may upload a new design to the system or may perform other actions 46 on the uploaded design, such as deleting a design or viewing its analytics.

Figure 12:
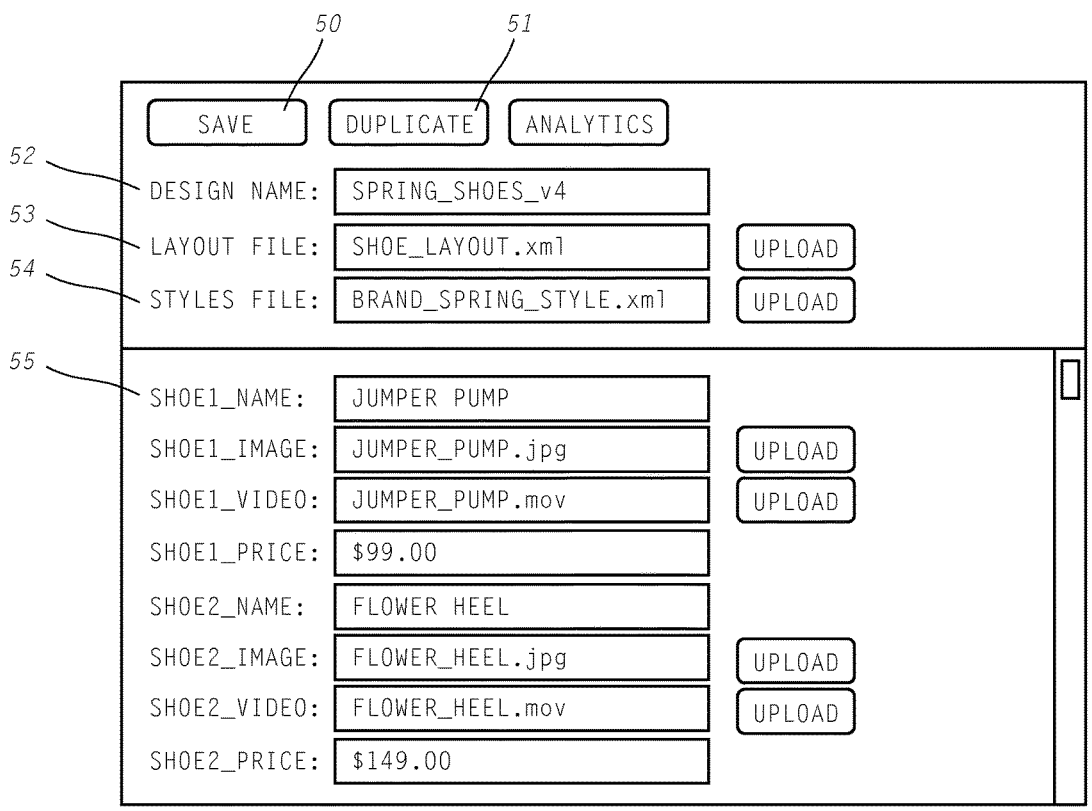

FIG. 12 show another interface to the server software. The screen shows data associated with a given design and allows the user to edit it. Specifically, it shoes the design name 52, the name of the layout file 53 and the name of style file 54. It also allows the user to edit any number of parameters or fields 55 in the given design format. Once changes are made, the user may save 50 or duplicate 51 the design.

Figure 13:
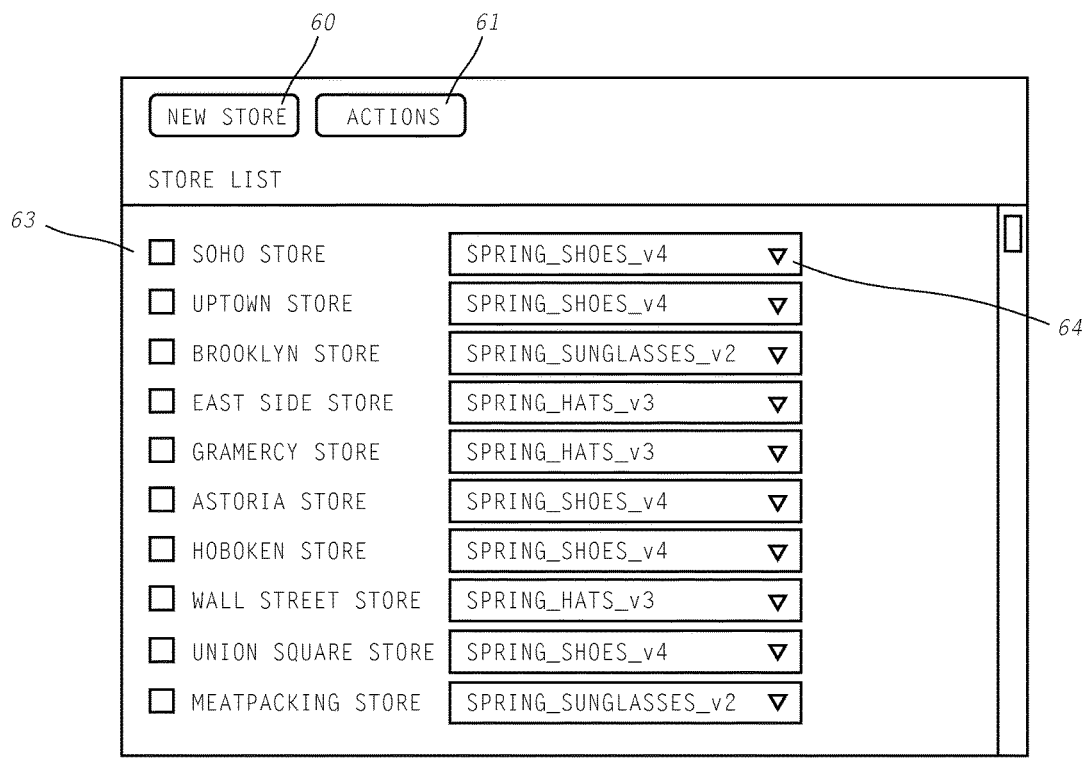

FIG. 13 shows a third interface to the server software. This screen allows the logged-in user to see all the in-store display units by store location 63. It also enables the user to create a new store location 60 and to perform actions upon that store display 61. One major feature of this screen is that it allows the user to assign a given design 64 to a specific store display. The user may also group stores together and then assign the group a given design all at once. Once this assignment is made, the in-store display will automatically download and switch over to the new design.

Figure 14:
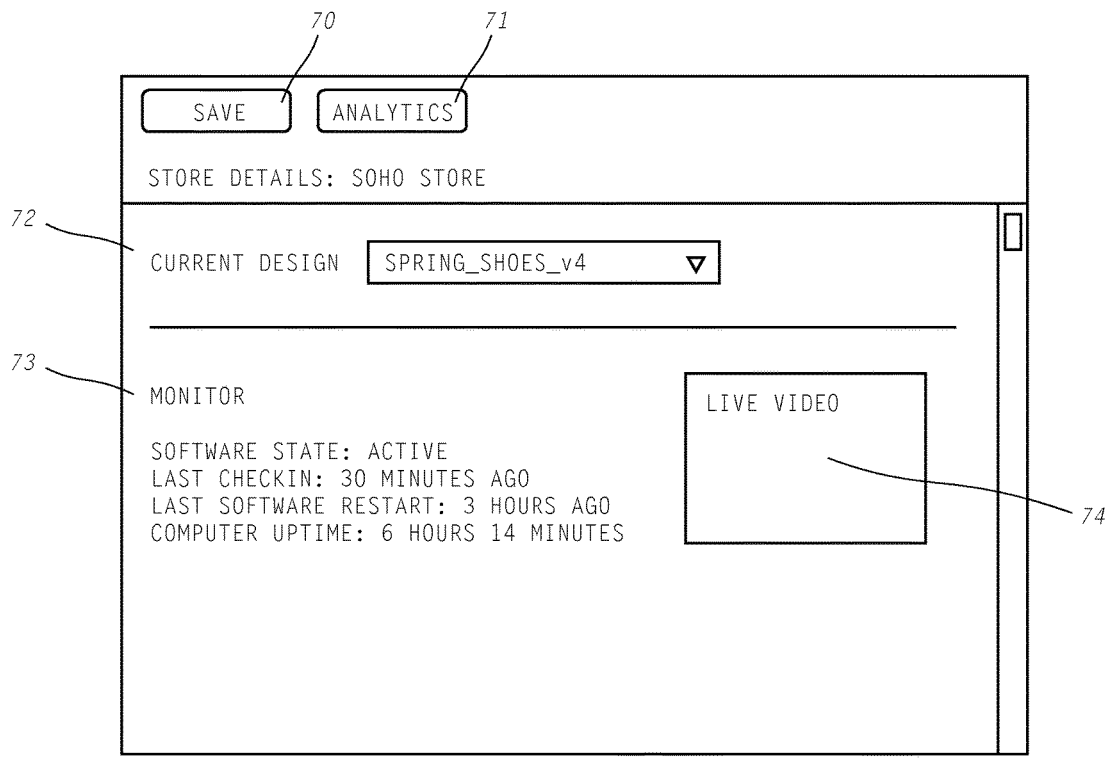

FIG. 14 shows a fourth interface to the server software. This screen displays the monitoring system. It allows a logged-in user to view all data associated with a given store display. In particular, one may access the analytics 71 for a store display. The user may also assign the design for the store display 72. The screen also shows the current state of the store display, including the state of the software and the timing of various system events. The screen also allows the user to see live video 74 from the sensor in the display hardware so they can view the current state of the physical display. The user may also save 70 any changes they make to the display settings on this screen.

Figure 15:
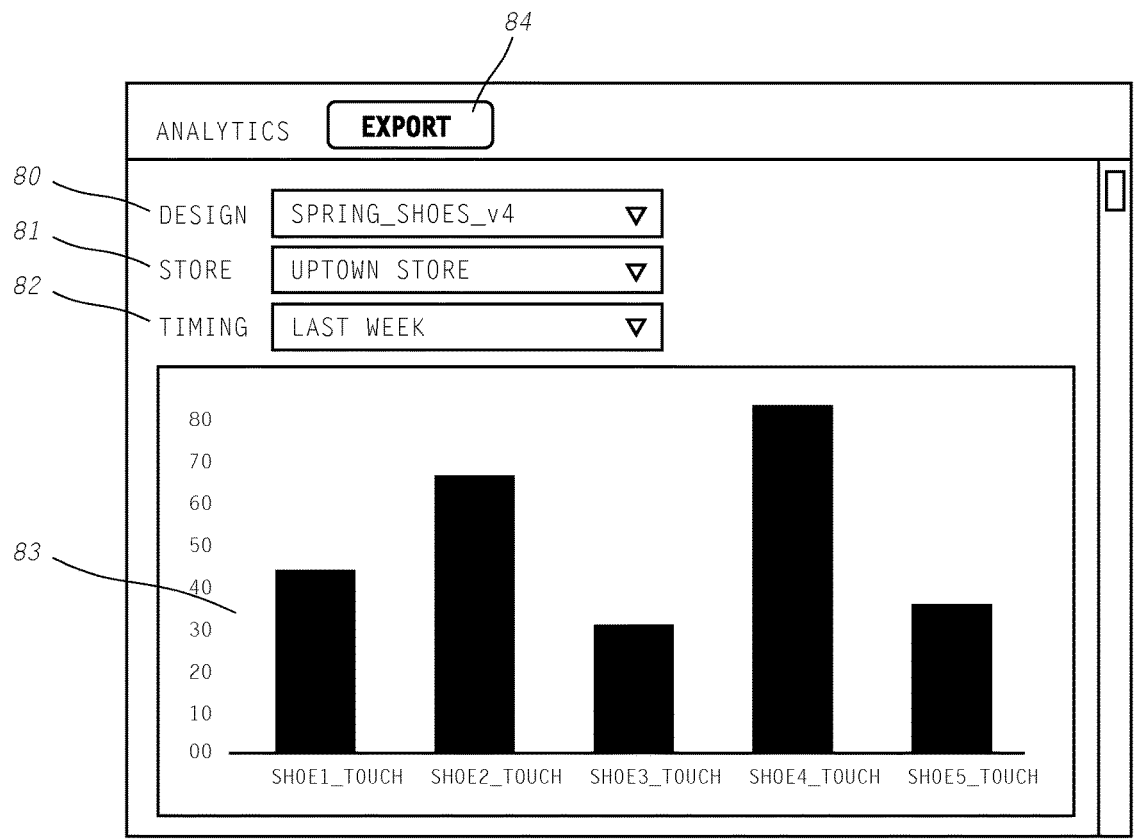

FIG. 15 shows a fifth interface to the server software. This screen displays the analytics data associated with a given in-store display. The user may select a design 80 and then choose a store 81 where that design is active. They may also choose to view the results of a given design across multiple stores. The user may set the timing 82 for the duration of analytics data that they would like to view. Upon making the choices above, the logged-in user will be presented with a graph 83 or other visualizations showing analytics data, including data about how often a given product is touched and how often a given button is touched. The user may also export 84 this data for viewing in and processing by another software application.

Figure 16:
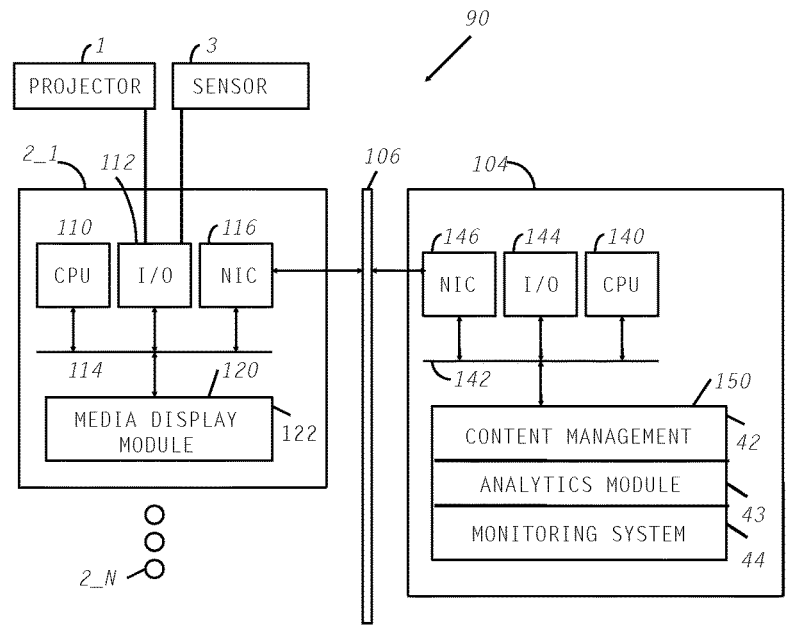
FIG. 16 illustrates a system configured in accordance with an embodiment of the invention.

FIG. 16 illustrates a system 90 configured in accordance with an embodiment of the invention. The system 90 includes a set of in-store computers 2_1 through 2_N, which communicate with a server 104 through a network 106, which may be any wired or wireless network. Each in-store computer 2 includes standard components, such as a central processing unit 110 connected to input/output devices 112 via a bus 114. The input/output devices may include a keyboard, mouse, display and external ports for connection to a projector 1 and sensor 3. A network interface circuit 116 is also connected to the bus 114 to provide connectivity to network 106. A memory 120 is also connected to the bus 114. The memory 120 stores a media display module 122. The media display module 122 displays media through projector 1 in response to consumer interactions with a product, as discussed above.

The server 104 also includes standard components, such as a central processing unit 140, a bus 142, input/output devices 144 and a network interface circuit 146. A memory 150 is connected to bus 142. The memory 150 stores executable instructions to implement operations of the invention. In this example, the executable instructions include a content management module 42, an analytics module 43 and a monitoring system 44, as discussed in connection with FIG. 10.

Figure 17:
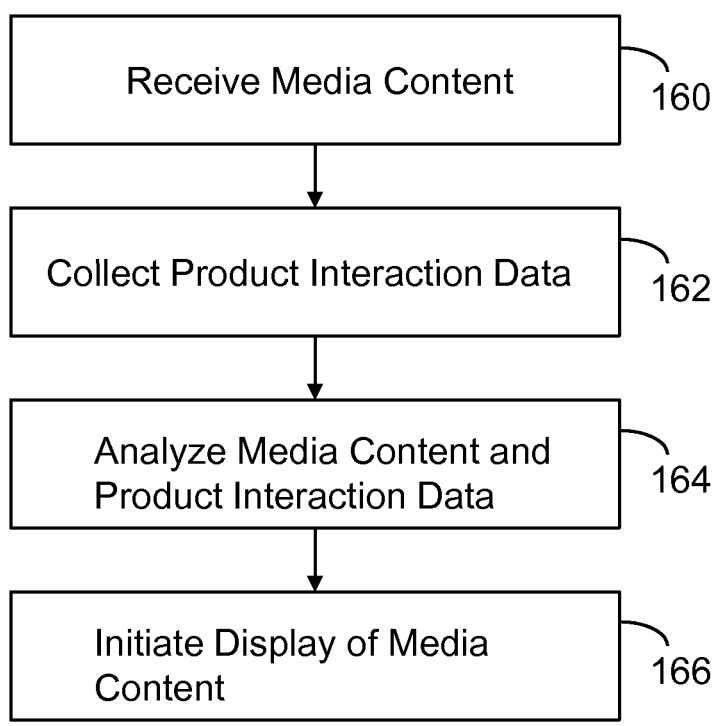
FIG. 17 illustrates processing operations associated with an embodiment of the invention.

Those modules may perform processing operations, such as shown in FIG. 17. Initially, media content is received 160. The media content may include individual media files for display in connection with a product. An individual media file may include one or more of a photo, text, graphs, graphics, tables, videos, animations, lighting effects, surveys, slideshows, menus, user ratings, user comments, related product information and executable code. The media content is displayed at an interactive product display, but this reception of the media content at the server 104 provides for a centralized resource to analyze media content and distribute it to a variety of retail establishments.

The next operation in FIG. 17 is to collect product interaction data 162. The server 104 collects the product interaction data from a variety of retail establishments. The product interaction data may include one or more of product interaction time stamps for individual product interactions at individual retail establishments, a product interaction duration indicator, a store identifier, a display identifier, a design identifier, a product identifier, an interface element identifier, a media identifier and an event action identifier.

The media content and the product interaction data are analyzed 164. One analysis may form marketing data. The marketing data may characterize the popularity of a given product relative to other products on display at an interactive product display. The marketing data may characterize the effectiveness of attracting consumers to an interactive product display. The marketing data may characterize the effectiveness of specific media in increasing consumer interactions. The marketing data may also characterize product popularity and media effectiveness across stores and geographic regions. The marketing data may identify selected media content for display at a retail establishment. Other analyses may result in product promotion information, as discussed below.

The final operation of FIG. 17 is to initiate the display of media content 166. The server 104 may initiate the display of media content by downloading media content to an interactive product display at a retail establishment. Alternately, the initiating of the display of media content may be a command to play specified media already stored at the interactive product display.

Primary attributes of the invention have now been fully described. The following discussion addresses implementation details and various alternate embodiments.

In one embodiment, the interactive display makes use of a projector with an LED or LED/Laser light source as the display device. In one embodiment, the projector is mounted vertically, facing downward on to a horizontal surface, approximately five or six feet below.

The interactive display makes use of a sensor capable of sensing in three dimensions. While the display can be constructed using a two-dimensional sensor, a three-dimensional sensor enables definitive sensing of the users interaction with the products on display. In particular, the three-dimensional sensor enables the system to detect if a user's hand is far above a product, near a product or touching a product. It also enables the detection of a product being removed from a given location.

The sensor may be a video camera, a three dimensional depth sensor, a force sensing resistor, an infrared proximity sensor, a magnetic proximity sensor, an inductive proximity sensor, an RFID sensor, an ultra-sonic proximity sensors and a light sensor.

The system for processing data may be a small computer capable of connecting to the projector and three-dimensional sensor. The computer is also capable of accessing the Internet either over WIFI or via a permanent connection. The computer is powerful enough to process the incoming sensing data in real time and is capable of producing intricate high-quality graphics in real time.

In one embodiment, the projector, the three-dimensional sensor and the computer are all mounted within a compact aluminum box that allows for ventilation of all components and has openings for the projector to project through and for the sensor to see through. The aluminum box is designed with standard VESA mounting holes so that it may be easily mounted to a wall, from a ceiling, or from a free-standing base.

In one embodiment, the interactive software file format is composed of three XML files: a "style.xml" file, a "layout.xml" file, and a "content.xml" file. The "style.xml" file specifies graphic elements and interactive structures that are incorporated via reference within the "layout.xml" file. The "layout.xml" file specifies the overall visual appearance of a given display and includes all of the interactive structures. It also specifies where each object is to be positioned on the surface. For example, it may specify that there be five shoes on the surface, and that when each shoe is removed, a specific bit of media is displayed. The "layout.xml" file also specifies which objects and interactions to track in the analytics system. The "content.xml" contains content such as text, images and videos for any placeholders that are in the "layout.xml" file. This separation of layout and content makes it easier to update content (such as product information, photos, etc) without having to touch the more complex layout or interactive structures. The "styles.xml" and "layout.xml" files together form what is referred to as a "template."

In one embodiment, all three XML files are read by the interactive software application upon launch. The interactive software creates interactive objects for all elements specific in the "styles.xml" and "layout.xml" files and populates those objects with data from the "content.xml" file. All objects are displayed in their specified default state.

In one embodiment, the interactive software receives frames of three-dimensional data from the sensor approximately 30 times per second. A variety of computer vision techniques, including background subtraction and contour derivation, are applied to the data frame in order to determine the state of all objects on the table, and to track the user's hands as they move around the surface. The computer vision techniques maintain the depth information throughout the processing.

One particularly unique implementation within the sensing sub-system is a class that defines a volume above the surface of the table and tracks interactions within that volume. Specifically, the volume is specified as a two-dimensional form on the table surface (e.g., a rectangle, circle, etc) and a height range above the table surface. For example, when tracking if the top of a bottle of perfume has been touched, one would define a circle around the base of the perfume, and constrain the interaction volume to 2" of space directly above the perfume bottle. Once this volume in space is defined, the sensing system continually monitors the sensing data within the two-dimensional area, and then analyzes if the three-dimensional position (the Z value) is within the range specified. This technique can also be used to specify the volume where an object is expected to be, unless it is picked up the user.

In one embodiment, the sensing system continually monitors the state of products on the table as well as the user's hand, and then generates interaction events based upon the relationship between the sensed data and the specified interaction locations. Interaction events include notification that a user has touched an object, removed an object from the table, put an object back on a table, or touched a button on the table surface. Other interaction events include hovering near an object, gesturing around an object and translation of an object. Product interaction data may also include product interaction time stamps for individual product interactions at individual retail establishments, a product interaction duration indicator, a store identifier, a display identifier, a design identifier, a product identifier, an interface element identifier and an event action identifier.

Once an interaction event is recognized, an event is sent that may trigger one of many possible visual displays or audio events. These include showing an image, an animation, a video, a bit of descriptive text, a review of the product or online rating. It may also trigger a visual display that spreads over the whole table and affects the displayed background image. The software may also play a brief audio track, encouraging other visitors to take notice of the display.

Every interaction event that is generated within software is passed on to the analytics tracking engine. The analytics data is stored locally and is uploaded to the server in real time. The analytics data packet includes information about which product is interacted with and when the event occurs. It also includes identification of the specific display unit on which the event occurs.

In one embodiment, a user authenticated content management system enables display owners (many of whom possess hundreds of displays) to manage the designs and content that appear on each of their displays. Once the user has logged in, the user may upload templates (consisting of the "styles.xml" file and "layout.xml" and associated resource) to the content management system. For each uploaded template, the content management system analyzes the "layout.xml" file looking for content placeholders. It then generates a form with fields corresponding to each placeholder. For example, a "layout.xml" file may have placeholders labeled "product1_name" and "product1_image". The content management system creates an online form with fields for these placeholders. The user may then type in a string for the "product1_name" and upload an image for the "product1_image". The combination of a template with specific content is called a "design".

Within the content management system, the user may view all of their display units that are currently deployed by name. The user may then choose for each display unit which "design" to use. All display units may be set to the same design, or each display unit may be assigned a different "design". Once these choices have been made and confirmed, they are stored within the content management system's database.

In one embodiment, the individual display units connect to the content management system via the Internet at a specified time, usually in the middle of the night when the store is closed. The display unit then requests the latest design assigned to it by the user. Every design has an associated modification date which is reported back to the display unit along with the name of the design. If the display already has a design with the same name and same modification date, then no update occurs. If the name or the modification date does not match what is presently being used, the display unit will download the entire design (as a single compressed zip file) and replace the current design with the new design. When the unit's projector is turned on by the store's employees in the morning, they will see the new design and place the appropriate objects in their correct location.

All analytics data may be available to users via the authenticated content management system. The analytics data reflects the current design and current set of products being used on each display unit. The analytics system allows the user to see data for a single display or compare data across displays that are utilizing the same design. It also can aggregate data across displays utilizing the same design. The analytics system provides a variety of ways to view its data, including as a bar graph per product, and as a line graph over time for a given product.

Various visualizations of product interaction data may be presented. The visualizations may be presented in accordance with specified parameters, such as a timestamp, a product identifier, a store identifier, a design identifier, an interface element identifier and an event action identifier. Filtered visualizations may include visualizations of product interaction data selected from a specified product at a specified retail establishment, a specified product at a number of retail establishments, multiple products at multiple retail establishments or comparisons of product promotion campaigns.

The product interaction data may be analyzed to produce product promotion information. For example, the product promotion information may be a media content recommendation for display with a product at a retail establishment. The product promotion information may be a sales alert (e.g., an email, text message, etc.) to an individual at the retail establishment. Alternately, the product promotion information may simply be a visualization of the product interaction data.

The authenticated content management system allows users to see the current state of each display unit, including whether it is on and functioning correctly. It also allows the user to see in full color video the current state of the display surface. This video is sourced from the color camera that is part of the sensing hardware.

Thus, a product-centered interactive media display is disclosed. The product-centered interactive media display is a structure in which a physical product or set of products is placed directly in front of or directly on top of a digital media display and in which interaction with the products (touching, picking up, hovering, etc) and interaction with the surface around the products constitute inputs into the interactive media system. A system is also disclosed for maintaining, managing and updating a large network of product-centered interactive media displays from a single location via a digital network.

Advantageously, the product-centered interactive media display utilizes a projection onto a traditional retail display surface so that existing retail furniture may be used. The system detects the state of a product on display and determines the state of interaction with the product. This state information is communicated to local software (e.g., the media display module 122) as well as a network-based storage system (e.g., content management module 42 of server 104).

One aspect of the invention is a file format that encodes placement of physical products on a retail surface, media related to those products, and the effect of interaction with the products on the media. A network-based design management system allows retailers to assign product-centered interactive media designs to specific displays located in stores within a network. Assignment of designs may also be done to displays in groups of stores.

An aspect of the invention is a network-based system for tracking, storing and analyzing data relating to user interactions with specific products across multiple stores. Comparative analysis may be performed between like products on like displays, like products on non-like displays, non-like products on like displays, and non-like products on non-like displays.

Another aspect of the invention is a software platform for designing, developing and updating product-centered interactive media displays. The development platform includes a documented file format, an application for pre-visualization of the display, and a graphical user interface for changing the layout and functionality of the design.

In one embodiment, system software designates an active region in three-dimensional space, relative to a product surface or to a specific product on display. The system software reacts to actions within that three-dimensional space, relative to a product. Interactive media may be altered based upon actions within or near that space.

An embodiment of the invention includes a system for automatically detecting the size and location of products on display in three-dimensions in a single pass. Interaction with those products is calibrated. Product-specific calibration allows for sensing the proximity of a users hand to a given product, and for triggering media events based upon those values. Dynamic lighting may be used in conjunction with the projector.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An interactive product display system for a retail establishment, comprising:
   a surface configured to hold at least one physical product;
   an imaging device configured to present media content in association with a physical product at the retail establishment;
   a sensor to gather product interaction data characterizing consumer interactions with the physical product, wherein the product interaction data includes a physical product identifier;
   a processor to evaluate the product interaction data and selectively alter media content to be displayed based upon the product interaction data, wherein the media content includes a textual description of the product; and
   a network interface circuit to upload the product interaction data to a centralized resource and receive from the centralized resource new media content,
   wherein
      when the sensor detects that the physical product is removed from the surface, the imaging device displays media content having a menu on the surface, and
      the processor alters the media content to be displayed by the imaging device in response to detecting interaction with an option of the menu of the displayed media content.

2. The interactive product display system of claim 1 wherein the media content includes individual media files for display in connection with the physical product, wherein an individual media file includes one or more of a photo, graphs, graphics, tables, videos, animations, lighting effects, surveys, slideshows, menus, user ratings, and user comments about the physical product.

3. The interactive product display system of claim 1 wherein the product interaction data includes physical product interaction time stamps for individual physical product interactions at individual retail establishments, a store identifier, a display identifier, a media identifier and an event action identifier.

4. The interactive product display system of claim 1 wherein the sensor is selected from a video camera, a three dimensional depth sensor, a force sensing resistor, an infrared proximity sensor, a magnetic proximity sensor, an inductive proximity sensor, an RFID sensor, an ultra-sonic proximity sensor and a light sensor.

5. The interactive product display of claim 1 wherein the imaging device displays the media content on a surface adjacent to the physical product.

6. The interactive product display of claim 1 wherein the network interface circuit receives from the centralized resource a command to invoke specified media content stored at the interactive product display system.

* * * * *